United States Patent Office 3,632,678
Patented Jan. 4, 1972

3,632,678
POLYPROPYLENE ACRYLIC MONOMER
COPOLYMERS
Raymond J. Ehrig, Barrington, Ill., and Samuel Liebman,
Silver Spring, Md., assignors to Dart Industries Inc.
No Drawing. Filed June 8, 1967, Ser. No. 645,857
Int. Cl. C08f 15/00, 1/28
U.S. Cl. 260—878 R
10 Claims

ABSTRACT OF THE DISCLOSURE

Production of copolymers of propylene and an acrylic monomer comprising:
(A) forming a solid crystalline polypropylene in a hydrocarbon solvent, and
(B) adding an acrylic monomer such as butyl acrylate and an alkyl lithium catalyst.
These copolymers are readily dyeable.

---

This invention relates to a novel process for the preparation of polypropylene copolymers which can be formed into fibers having excellent dyeability.

As is well-known in the art, propylene can be polymerized to a high molecular weight, solid polymer by contacting it with an organo-metallic catalyst such as titanium trichloride/triethyl aluminum, as described, for example in Belgian Pat. 538,782 and U.S. Pats. 2,949,447; 2,911,-384; 2,825,721; 3,112,300; and 3,175,999. Generally, such processes produce polypropylene having a molecular weight of from about 50,000 to about 5,000,000, with the major proportion of the polymer being crystalline as determined by X-ray analysis. Since these polymers exhibit high tensile strength, a high modulus of elasticity, and good degradation resistance at elevated temperatures, they have found wide use in the textile and other industries as fiber-forming polymers. However, wider use of these polymers has been retarded due to their resistance to coloration by processes such as printing and dyeing.

It is therefore an object of the present invention to provide novel methods for the preparation of polypropylene copolymers.

Another object of the present invention is to provide a novel method for the preparation of propylene polymers having increased susceptibility to coloration.

Still another object of the present invention is to provide methods for the production of these novel copolymers.

Additional objects and advantages of the present invention will be apparent by reference to the following detailed description.

The improved propylene polymers of the present invention are copolymers are produced by a method comprising, in sequence, the steps of:
(A) forming a crystalline, solid polypropylene in a hydrocarbon solvent, and
(B) adding an acrylic monomer and an alkyl lithium catalyst.

Any suitable hydrocarbon solvent can be employed, examples of which include, among others, propane, butane, isobutane, n-heptane, iso-heptane, kerosene, gasoline, decahydronaphthalene available commercially as Decalin and mixtures thereof.

Acrylic monomers suitable for use in the present invention are those of Formula I:

(I)
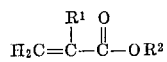

wherein $R^1$ is hydrogen or methyl and $R^2$ is an alkyl radical; an alkyl amino substituted alkyl radical or an alkoxy substituted alkyl radical. $R^2$ is most preferably an alkyl radical. Examples of suitable acrylic monomers wherein $R^2$ is alkyl, are the acrylates examples of which include, among others, methyl acrylate, ethyl acrylate, butyl acrylate, 2-ethylhexyl acrylate, methyl methacrylate, ethyl methacrylate, butyl methacrylate, isobutyl methacrylate, lauryl methacrylate, stearyl methacrylate, dimethylaminoethyl methacrylate, t-butylaminoethyl methacrylate, t-butylacrylate, ethoxyethyl methacrylate and mixtures thereof. The preferred acrylic monomers are $C_1$ to $C_6$ alkyl esters of acrylic and methacrylic acid.

In the first step of the process of the present invention, a mixture of the organo-metallic catalyst and polypropylene is formed. Preferably, this mixture is formed by reacting the propylene with the organo-metallic catalyst until a desired amount of the propylene has been polymerized, removing any unreacted monomer from the system such as by distillation or purging, and then employing the resulting reaction mixture of solid polypropylene and catalyst directly in the second step of the process of the present invention in which an alkyl lithium catalyst is employed. It is, however, possible to take a preformed polypropylene and add thereto the organo-metallic catalyst in catalytic concentrations normally employed for the polymerization (i.e. 0.001 to 10% based on the weight of polymer) and thereafter subject this mixture to the second step of the process of the present invention. The mixture of polypropylene and organo-metallic catalyst when formed in either of the ways described can contain inert hydrocarbon solvents normally employed in the polymerization process, although polymerizable propylene must be removed from the system before the second step of the process of the present invention is attempted. In such systems, the solid polypropylene can be in the form of a slurry or a dispersion. In general, it is preferred to obtain a mixture of organo-metallic catalyst and polypropylene which does not contain a solvent. Methods whereby alpha olefins are polymerized with the organo-metallic catalyst which do not involve the use of inert solvents such as, for example, in the liquid bulk polymerization of olefins are therefore preferred methods of obtaining the described mixture. Such polymerization techniques, furthermore, allow the removal of unreacted monomer, necessary to prevent interference of the olefin monomer in the second step of the process of the present invention, more readily than other polymerization methods in which solvents are present. Particularly preferred organo-metallic catalysts employed in the polymerization of ethylene, propylene, and mixtures of ethylene and propylene are the catalysts obtained by the reaction of titanium tetrachloride, titanium trichloride, and particularly aluminum-containing titanium trichloride, with aluminum trialkyls and aluminum alkyl halides in which the alkyl radicals contain from 1–4 carbon atoms and in which the halide is preferably a chloride.

The alkyl lithium catalysts useful in the second step of the methods of the present invention are those having 1 to 10 carbon atoms. The preferred catalysts are the aliphatic lithium catalysts, examples of which include, among others, methyl lithium, ethyl lithium, propyl lithium, isopropyl lithium, heptyl lithium, decyl lithium. Especially preferred are the butyl lithium catalysts such as n-butyl lithium, sec-butyl lithium, and tert-butyl lithium. The alkyl lithium is employed in concentrations normally employed in the initiation of additional polymerization with an organo-metallic catalyst. Generally the catalyst concentrations will be in the range of 0.001 to 10% by weight of the reactions mixture. Preferably equimolar amounts of the alkyl lithium and organometallic reaction product employed as initiator in the formation of the polypropylene are used.

Solid, crystalline, polypropylene can be formed according to reactions and under conditions well-known in the art and, in general, by contacting the monomeric propylene with an organo-metallic catalyst such as titanium trichloride/diethyl aluminum chloride in a hydrocarbon solvent at a temperature between 75° and 120° C. The polymerization is generally continued until substantially all of the propylene has been poylmerized. Preferably unreacted propylene is removed prior to the addition of the acrylate.

The second step of the process comprises adding an excess of the acrylic monomer, e.g. 10 to 100% in excess of the amount desired to be incorporated into the polymer and the alkyl lithium catalyst at a temperature between −50° C. and 150° C. This step can be carried out in the presence or absence of the catalyst from the propylene polymerization step. The first and the second step can be performed at the same or at different temperatures within the above specified ranges. The alkyl lithium catalyst can be added alone or as a solution in any of the above described hydrocarbon solvents. The resulting copolymer is separated from the catalyst residues by methods heretofore developed for the separation of hydrocarbon polymers from organometallic catalysts or catalyst residues. Such methods generally involve treating the reaction mixture with an active hydrogen containing material such as water, alcohol or dilute mineral acid. Sequestering agents such as chelating agents are also highly useful.

The crude copolymers produced by the above-described process contain from about 0.1 to about 10% by weight of the polypropylene of the acrylic monomer. However, a portion of the polymerized monomer may consist of a homopolymer of the acrylic monomer which can be removed from the polymerized composition by successive extractions with solvents such as chloroform, the unextractable remainder of the acrylic monomer being in the form of a copolymer. Even the presence of small concentrations (i.e. 0.1 to 1.0% of copolymerized acrylic monomer) is sufficient to impart increased susceptibility to coloration.

The copolymers of the present invention are useful in all application heretofore developed for solid, crystalline polypropylene, i.e. fibers, films, molded articles and the like. Because of their ability to retain dyes better than the unmodified polypropylene the copolymers are of particular utility in the preparation of dyeable fibers, printable film and containers.

Although the present invention is principally described in terms of a polypropylene homopolymer it is to be understood that the process is equally applicable to crystalline propylene polymers obtained by the random or block copolymerization of propylene and ethylene. The term polypropylene as used herein is thereof intended to include crystalline polymers of propylene containing minor amounts, i.e. less than 50% of ethylene.

This invention is further illustrated by reference to the following examples, in which all parts and percentages are by weight unless otherwise specified. It is to be understood that the operative examples are illustrative of certain embodiments and are not intended to limit the scope of the invention.

EXAMPLE 1

A weighed amount of 'AA' Titanium trichloride (0.54 gm.) is introduced into a 750 ml. stirred resin kettle under a flow of argon, followed by the addition of 300 ml. of dried Decalin. The resin kettle is then heated to 120° C. and 0.45 gm. of diluted diethyl aluminum chloride is added. Propylene is then bubbled through the reactor continuously for one hour at atmospheric pressure. The propylene feed is then stopped and 0.24 gm. of butyl lithium is added followed by 15 ml. (13.5 gm.) of butyl acrylate. The mole ratios of titanium trichloride to diethyl aluminum chloride to butyl lithium is 1:1:1.

The reaction is continued for two and one-half hours at 120° C., and methanol -HCl added to stop the reaction. The hot slurry is then filtered and washed repeatedly with methanol, methanol-heptane, water, heptane and methanol filtering after each washing. After filtering the polymer is vacuum dried for four hours at 80° C. The product is then cooled to room temperature. Infrared analysis calculated from the carbonyl moiety absorption band at 1735 cm.$^{-1}$ indicates a content of 2.3 weight percent butyl acrylate. The product is then extracted with chloroform three times, reanalyzed after each extraction and found to contain 1.3, 0.8, and 0.8 weight percent butyl acrylate, respectively. Propylene prepared by the foregoing procedure in the absence of butyl acrylate contains no carbonyl moiety.

EXAMPLE 2

"AA" Titanium trichloride (0.54 gm.) is introduced into a 750 ml. stirred resin kettle under a flow of dry argon, followed by the addition of 300 ml. of dried heptane. The resin kettle is heated to 75° C. and 0.44 gm. of diethyl aluminum chloride is added. Propylene is bubbled through continuously at atmospheric pressure for 1 hour. The propylene feed is stopped, the reactor cooled to 50° C., heptane solvent removed and 300 ml. of fresh solvent added. At 0° C., 0.24 gm. of butyl lithium is added. At −20° C. 10 ml. (8.9 gm.) of tert.-butyl acrylate is added slowly over a period of 30 minutes. The molar ratio of titanium trichloride to diethyl aluminum chloride to butyl lithium is 1:1:1. The reaction is continued for twenty hours at −40° C. The reaction mixture is allowed to come to room temperature and the polymer product is purified and isolated as set forth in Example 1. The product is then extracted twice with chloroform and analyzed to contain 0.87 weight percent tert.-butyl acrylate, calculated from the carbonyl moiety absorption band at 1735 cm.$^{-1}$.

EXAMPLE 3

This experiment is conducted in a 1 liter stainless steel pressure reactor equipped with a stirrer, thermocouple, inlet tube, and a heating-cooling jacket. The vessel is cleaned, dried, and purged with dry nitrogen prior to charging.

A weighed amount of "AA" titanium trichloride (2.03 m. moles) is introduced into the reactor followed by 4.75 moles of propylene. The temperature is increased to 60° C. and 4.06 m. moles of diethyl aluminum chloride in heptane solvent is added under pressure followed by 7.5 p.s.i. hydrogen. The temperature increased to 65° C. and the reaction is continued for two hours. The unreacted propylene is vented off, 150 ml. of dry heptane, 0.5 mole butyl acrylate and 6.09 m. moles of n-butyl lithium in hexane is added. The temperature is lowered to 14° C. and the reaction is allowed to continue for five hours.

After allowing the reaction mixture to come to room temperature, the polymer product is filtered, slurried with heptaneisopropanol, filtered, washed repeatedly with the hydrocarbonalcohol mix, filtered, and vacuum dried. The initial butyl acrylate content, calculated from the infrared carbonyl absorption band at 1735 cm.$^{-1}$, is 1.2%. After repeated extractions with chloroform, the polymer is found to contain 0.5% butyl acrylate. Other properties of the polymer are: Density=0.9093 gm./cc.; Vicat softening temperature=167° C.; Tensile strength—3600 p.s.i.; Elastic modulus=227,000 p.s.i.; Second order transition point=11° C.; Reduced solution viscosity=2.4 dl./gm.

EXAMPLE 4

This experiment is conducted in a 1 liter stainless steel pressure reactor equipped with a stirrer, thermocouple, inlet tube, and a heating-cooling jacket. The vessel is cleaned, dried, and purged with dry nitrogen prior to charging.

This experiment was conducted in the same manner as Example 3. Titanium trichloride (AA) 1.24 m. mole; diethylaluminum chloride (2.48 m. moles) in heptane solvent, 4.75 moles of propylene and 7.5 p.s.i. hydrogen was used in the first stage of the reaction. This was followed by 0.5 mole of t-butyl acrylate, 150 ml. of dry heptane and 3.71 m. moles of n-butyl lithium in hexane. The first phase of polymerization was conducted at 65° C. for two hours and the second stage at 14° C. for five hours. The purified polymer showed 1.9% t-butyl acrylate incorporation as calculated from the infrared carbonyl absorption band at 1735 cm.$^{-1}$. The properties of this polymer are:

| | |
|---|---|
| Density (gm./cc.) | 0.9101 |
| Vicat (° C.) | 163 |
| Tensile strength (p.s.i.) | 4500 |
| Elastic modulus (p.s.i.) | 223,000 |
| Tg (° C.) | 3 |
| RSV (dl./gm.) | 4.0 |

EXAMPLE 5

This experiment was conducted as in Example 4 but with 1.85 m. moles of "AA" titanium trichloride, and 3.71 m. moles of diethylaluminum chloride in heptane. The resulting polymer contains 0.9% t-butyl acrylate when analyzed in accordance with the above examples. The polymer also showed an RSV of 5.3 dl./gm. and a Tg of 0° C.

Although the invention has been described in considerable detail with reference to certain preferred embodiments thereof, it will be understood that variations and modifications can be effected within the spirit and scope of the invention as described hereinabove and defined in the appended claims.

What is claimed is:

1. A method for producing a dyeable propylene polymer comprising the steps of:
   (A) providing a polypropylene polymer;
   (B) adding thereto (1) an acrylic monomer having the formula

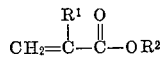

wherein $R^1$ is hydrogen or a methyl radical and $R^2$ is selected from the group consisting of alkyl, alkyl amino substituted alkyl, and alkoxy substituted alkyl radicals having 1 to 10 carbon atoms, said acrylic monomer being added in an amount in excess of the amount desired to be incorporated into the dyeable propylene polymer, and (2) 0.001 to 10% by weight of an alkyl lithium catalyst wherein the alkyl radical has 1 to 10 carbon atoms;
   (C) and polymerizing the mixture obtained from steps (A) and (B) at temperatures in the range of −50° C. to 150° C. to obtain the dyeable propylene polymer.

2. A method according to claim 1 wherein the acrylic monomer is a $C_1$ to $C_6$ alkyl ester of acrylic acid or methacrylic acid.

3. A method according to claim 1 wherein the alkyl radical of the alkyl lithium catalyst has four carbon atoms.

4. A method for producing a dyeable propylene polymer comprising the steps of:
   (A) providing a mixture of polypropylene polymer and an organo-metallic catalyst obtained by reacting (1) titanium tetrachloride, titanium trichloride or an aluminum-containing titanium trichloride with (2) an aluminum trialkyl or aluminum alkyl halide wherein the alkyl radicals have 1 to 4 carbon atoms;
   (B) adding thereto (1) an acrylic monomer having the formula

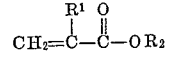

wherein $R^1$ is hydrogen or a methyl radical and $R^2$ is selected from the group consisting of alkyl, alkyl amino substituted alkyl, and alkoxy substituted alkyl radicals having 1 to 10 carbon atoms, said acrylic monomer being added in an amount in excess of the amount desired to be incorporated into the dyeable propylene polymer, and (2) 0.001 to 10% by weight of an alkyl lithium catalyst wherein the alkyl radical has 1 to 10 carbon atoms;
   (C) and polymerizing the mixture obtained from steps (A) and (B) at temperatures in the range of −50° C. to 150° C. to obtain the dyeable propylene polymer.

5. A method according to claim 4 wherein the mixture of polypropylene polymer and an organo-metallic catalyst is formed by polymerizing propylene monomer in the presence of the organo-metallic catalyst and removing any unreacted propylene monomer.

6. A method according to claim 5 wherein the polymerization of propylene monomer is in the presence of a hydrocarbon solvent.

7. A method according to claim 4 wherein the acrylic monomer is a $C_1$ to $C_6$ alkyl ester of acrylic acid or methacrylic acid.

8. A method according to claim 4 wherein the alkyl radical of the alkyl lithium catalyst contains four carbon atoms.

9. A method for producing a dyeable propylene polymer comprising the steps of:
   (A) polymerizing propylene monomer in a hydrocarbon solvent at temperatures of 75° to 120° C. in the presence of .001 to 10% by weight an organo-metallic catalyst obtained by reacting (1) titanium tetrachloride, titanium trichloride, or an aluminum-containing titanium trichloride with (2) an aluminum trialkyl or aluminum alkyl halide wherein the alkyl radicals have 1 to 4 carbon atoms, and then removing any unreacted propylene monomer from the resulting polymerization mixture;
   (B) adding thereto (1) an acrylic monomer having the formula

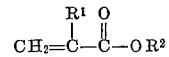

wherein $R^1$ is hydrogen or a methyl radical and $R^2$ is selected from the group consisting of alkyl, alkyl amino substituted alkyl, and alkoxy substituted alkyl radicals having 1 to 10 carbon atoms, said acrylic monomer being added in an amount in excess of the amount desired to be incorporated in the dyeable propylene polymer, and (2) 0.001 to 10% by weight of an alkyl lithium catalyst wherein the alkyl radical has 1 to 10 carbon atoms;
   (C) and polymerizing the mixture obtained from steps (A) and (B) at temperatures in the range of −50° C. to 150° C. to obtain the dyeable propylene polymer.

10. A method according to claim 9 wherein the acrylic monomer is a $C_1$ to $C_6$ alkyl ester of acrylic acid or methacrylic acid and the alkyl radical of the alkyl lithium catalyst has four carbon atoms.

References Cited

UNITED STATES PATENTS

| | | | |
|---|---|---|---|
| 3,102,050 | 8/1963 | Canterino et al. | 117—100 |
| 3,162,697 | 12/1964 | Canterino | 260—878 |
| 3,205,156 | 9/1965 | Atarashi | 204—154 |
| 3,287,335 | 11/1966 | Stuetz | 260—86.7 |
| 3,316,229 | 4/1967 | Vandenberg | 260—89.5 |
| 3,458,598 | 7/1969 | Craven | 260—877 |

JOSEPH L. SCHOFER, Primary Examiner

S. M. LEVIN, Assistant Examiner

U.S. Cl. X.R.

260—88.2 R, 93.7